June 28, 1932.    S. A. MOSS ET AL    1,864,926
METHOD OF PRODUCING FROM NATURAL GRAVEL DEPOSITS
A GRAVEL AGGREGATE FOR USE IN CONCRETE
Filed Feb. 12, 1930    2 Sheets-Sheet 1
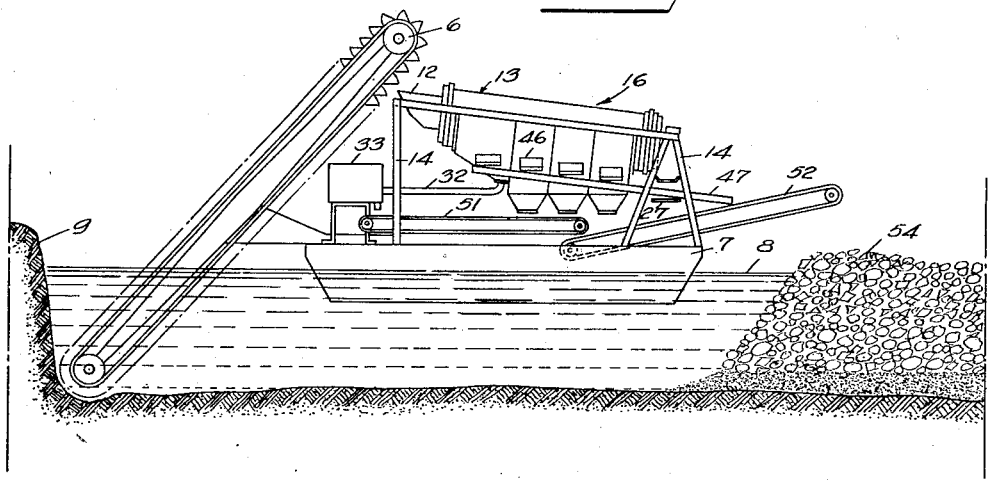
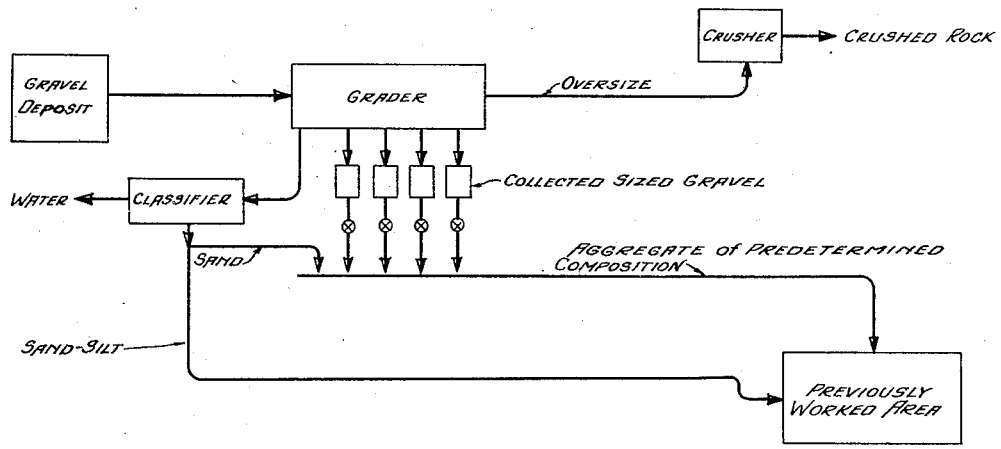
INVENTORS
SAMUEL A. MOSS
JAMES GEDDES
BY
ATTORNEYS.

June 28, 1932. S. A. MOSS ET AL 1,864,926
METHOD OF PRODUCING FROM NATURAL GRAVEL DEPOSITS
A GRAVEL AGGREGATE FOR USE IN CONCRETE
Filed Feb. 12, 1930 2 Sheets-Sheet 2
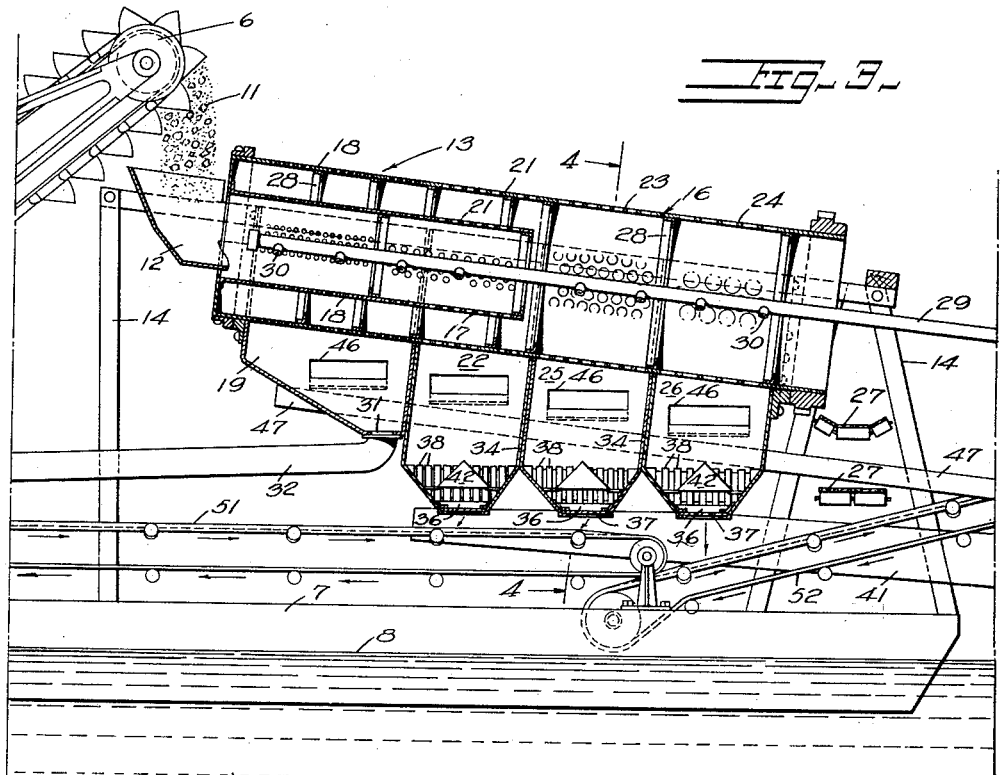
Fig. 3
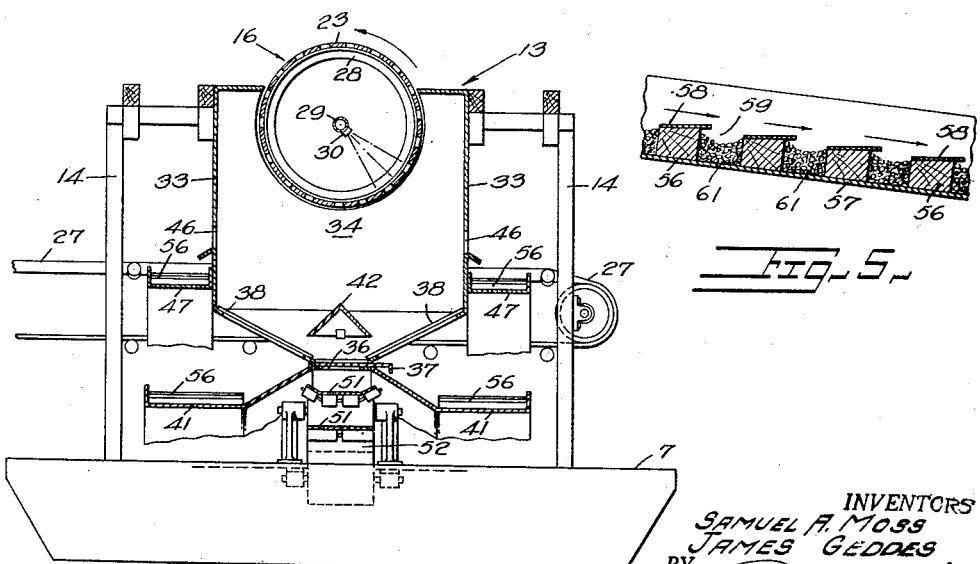
Fig. 4
Fig. 5
INVENTORS
SAMUEL A. MOSS
JAMES GEDDES
BY
ATTORNEYS.

Patented June 28, 1932

1,864,926

UNITED STATES PATENT OFFICE

SAMUEL A. MOSS, OF ALAMEDA, AND JAMES GEDDES, OF SACRAMENTO, CALIFORNIA

METHOD OF PRODUCING FROM NATURAL GRAVEL DEPOSITS A GRAVEL AGGREGATE FOR USE IN CONCRETE

Application filed February 12, 1930. Serial No. 427,966.

This invention relates to a method of producing from gravel deposits an aggregate of a predetermined composition for use in concrete and to an apparatus suitable for carrying out the method. It is an object of the invention to provide a method for excavating and so processing gravel that an aggregate useful in concrete is secured having a predetermined composition. We preferably conduct the formation of the desired aggregate by setting up a continuous flow of material from which the undesired constituents and any excess of desired constituents are removed so that the final product is size segregated and has a predetermined size composition.

Another object of the invention is to devise an apparatus suitable for excavating the gravel deposits and capable of processing the excavated gravel to provide an aggregate for use in concrete having a predetermined composition.

In the State of California certain sizable areas of land have been worked over for gold by hand and by machine. These areas are unsuited for agriculture because the gravel has been left at the surface, the earth portion having been distributed through the gravel so that it is not available for fertilization, plowing and planting of crops. In accordance with the present invention these areas are worked to reclaim the land for agricultural uses while securing a merchantable gravel product.

A further object of the invention is to provide for a method of securing gravel while reclaiming and leaving the land fit for agricultural uses.

The invention possesses other advantageous features and objects, some of which, with the foregoing, will be set forth at length in the following specification and drawings accompanying and forming a part of the specification. In the drawings we have illustrated a preferred form of apparatus embodying our invention but it is to be understood that we are not to be limited to the particular form shown since the apparatus, as defined by the claims, may be embodied in other forms.

In the drawings to which we have made reference above, Figure 1 is a schematic showing of an apparatus in an environment wherein the gravel composition desired may be produced.

Figure 2 is a diagrammatic flow sheet which we may employ.

Figure 3 is a side elevation of an apparatus employed with our invention, portions of the apparatus being shown in section to illustrate details of construction.

Figure 4 is a section on the line 4—4 of Figure 3, illustrating the construction of certain of the apparatus employed.

Figure 5 is a side elevation of a sluice.

Briefly stated our invention may be said to comprise the establishment of a flow of material from a source through certain manipulations which remove undesired constituents and size segregate desired constituents while caring for any excesses of the desired constituents so that the size segregated constituents are subsequently gathered to form a predetermined composition. As supplementary features of this we provide for the removal of certain of the constituents of the gravel and their subsequent employment to definite ends. In this connection, we are able to resoil the land being worked so that it is fit for agricultural uses. Since our process is successfully operated on such lands as the tailings from gold dredging operations, we are able to reclaim this land profitably from both a gravel manufacturing standpoint and from a reclamation standpoint.

The method of manipulating the material is preferably conducted on a supporting structure which is capable of movement and advance to excavate the gravel. An apparatus which we have successfully employed is as shown in Figure 1 wherein we provide suitable excavating machinery 6 upon a hull 7 floating in a body of water 8 and adapted to be held adjacent a gravel deposit 9 by cables or spuds not shown. This body of water may be that of a stream, lake or of a pond artificially produced. In working inland gravel deposits removed from any sizable body of water we provide a pond and fill this with water to float the hull as in gold dredging operations. As the excavating machinery 6 removes the gravel and extends the pond, the hull is moved along and held adjacent the deposit by employing the cables or spuds. Gravel processed, as will presently appear, is used to fill up the pond and so confine it to a relatively small area.

We prefer that gravel removed from the deposit be manipulated so that a flow is maintained from which are diverted those constituents not desired in the final aggregate. Certain of the diverted constituents are, in our preferred process, so handled that the land worked for the gravel is resoiled and made fit, in this respect, for agricultural uses.

In accordance with a successful form of our invention, material from the excavating machinery 6 is discharged into an apparatus capable of continuously receiving and manipulating the material to the end desired. As is particularly shown in Figures 3 and 4, gravel indicated at 11 is discharged into a hopper 12 which is in communication with a grader generally designated at 13. The grader, preferably capable of classifying the material as to size, is mounted for rotation upon supports 14 carried as on the hull 7. In the form of grader shown, we have utilized several suitably supported screens 16 having apertures therein of different sizes so that the excavated material is sized as the grader is rotated. The grader is best placed at an angle to the hull so that gravity aids the flow of material through the grader.

We have found it desirable to employ an inner screen 17 for receiving material immediately from the hopper, the screen being capable of passing only relatively small size gravel together with sand. In a successful form of our invention, apertures in sections 18 of the inner screen 17 and of the screens 16 were of such a size that material below a quarter of an inch in diameter and less collected in bin 19 into which sections 18 discharged. Second sections 21 of the inner screen 17 and of the screens 16 were so arranged that particles between a quarter of an inch and three quarters of an inch collected in bin 22, gravel over this size being discharged onto portions 23 and 24 of the screen 16. These portions were respectively capable of passing material up to an extreme size of an inch and a quarter into bin 25 and up to two and a half inches into bin 26. Gravel over this size was discharged from the grader onto transverse stacker 27. The several portions of the screens are suitably supported to withstand the operations and are also divided off from each other by annular members 28. These serve to confine the gravel to the various portions, preventing it from sliding directly through the grader.

Since the gravel, as excavated, includes sand, clay and silt which tend to adhere to the stones forming the gravel we provide means for removing these constituents. Such means comprised, in the successful form of our invention, a pipe 29 extending longitudinally of the grader 13 and supplied with water by a pump not shown. A plurality of nozzles 30 were positioned on the pipe so that their discharge fell upon the mass of material in the rotating grader. The water washes off adhering material into the bin 19. By freeing the gravel of the adhering material its sizing is facilitated.

The bin 19, which receives the sand, silt and the particles below a quarter of an inch in size, converged into an outlet 31 to which was connected a pipe 32. This pipe led away to a classifier 33 which operated in accordance with certain well known principles to remove the sand and larger particles from the silt and other undesired material present. The classified material was recovered from the classifier and was subsequently utilized as will presently appear.

The several bins in which the material was collected were formed by longitudinal walls 33 extending about the grader 13 and transverse walls 34 which divided the several bins off from each other. Each of the bins converged to an outlet portion 36 in which was positioned a valve 37 so that the discharge from the bin could be regulated. The convergence of the bins was preferably accomplished by employing a plurality of bars 38 extending inwardly toward the outlet portion, the bars being spaced from each other so that the gravel was retained while water drained out onto waste sluices 41.

Means were also provided to prevent the collected graded gravel from packing about the inlet and cavitating to prevent discharge of gravel. This was preferably accomplished by supporting a conical member 42 over the outlet and spaced therefrom so that the discharge took place between the member and the outlet portion. This conical member also performed the function of minimizing the effect of the quantity of the material in the compartment, tending to equalize the pressure exerted upon the discharge and make the quantity discharged constant for any particular setting of the valve 37 irrespective of the height of material above.

In some instances a greater percentage of certain sized constituents will be collected in one of the compartments than will be collected in another. While the particular aggregate being made may take care of this, it sometimes happened otherwise and we prefer to provide overflows from each of the bins. This was done by providing apertures 46 in the longitudinal walls 33, the discharge taking place into sluice ways 47 so that the excess material is carried away.

In operation, the hull being in position adjacent the gravel deposit and the excavating machinery continuously removing gravel from the deposit and discharging it into the grader 13, an aggregate having a predetermined composition was secured by adjusting the gates 37 so that a predetermined quantity discharge took place continuously from each of the bins containing the sized material. At the same time the undesired constituents such as silt and clay were washed out while oversize constituents were removed. The material discharged from the bins was received upon suitable means as a conveyor 51 which carried it away. A preferred construction for this is shown in Figure 3 wherein the conveyor 51 receives the discharge from several of the bins and in turn discharges onto a stacker belt 52 upon which others of the bins discharge so that the proportioned materials are mixed together while being conveyed. The stacker belt 52 carried the aggregate having the predetermined composition over the stern of the hull and stacked it in a pile indicated at 54. The stacker may also discharge the aggregate, if desired, into suitable equipment for storage or for transportation.

The transverse stacker 27 is employed to carry oversize material to a crushing mechanism not shown wherein the material is reduced in size although it may be stacked if desired and not used. The crushed material may subsequently be incorporated with the gravel or handled separately. In other instances it may not be desirable to employ the waste material in this manner, under which conditions we have laid it as a base for the stacked aggregate.

The correct proportion of the sand recovered from the classifier has been directly incorporated with the aggregate by discharging it on the conveyor belt 51 to be mixed in directly with the other constituents of the aggregate as they are assembled. In other instances, it may be preferred to handle the discharge of the classifier separately and to mix the sand with the gravel when the concrete is being mixed.

Our invention, as set forth above, provides for the working of gravel deposits in an efficient, economical and convenient manner. It is possible to form cheaply and quickly an aggregate having a predetermined composition so that a concrete of definitely controlled composition and strength is secured. The aggregate is formed directly at the deposit thus obviating the necessity for transporting any constituent which may subsequently be deemed undesirable. Further, the process in its preferred form, is conducted in a continuous manner thus reducing the necessity of handling or storing large quantities of separate sizes of the gravel.

When it is desired to reclaim the land, as when the aggregate is formed from dredging tailings, we arrange that the discharges from sluices 41 and 47 are handled so that the sand and silt therein is removed from the water and placed at the bottom of the pond. A simple way to accomplish this is to allow the sluices to discharge into the pond so that the sand and silt settle and deposit on the bottom. If desired, the sand and silt may be removed from the sluice discharges by employing sand wheels not shown, the separated sand and silt being deposited by a conveyor mechanism on an area previously worked. The aggregate composition can be stacked on the deposited sand and silt and, when the aggregate is subsequently removed, the area is ready for possible agricultural uses. If desired the aggregate is not placed on the resoiled area but is placed in cars or in storage bins so the land is left clear. Sand and other suitable materials recovered in the bin 19 can also be employed to resoil the area.

When working over gold dredging tailings, we prefer to include means for recovering gold while handling the gravel. A manner of accomplishing this is by providing the sluices so that they collect gold passing into them. A construction capable of accomplishing this is as shown in Figure 5 wherein a number of small wood strips 56 are spaced along bottom 57 of the sluice. Facings 58 of steel or other wear resisting material are positioned on each of the strips, the facings extending downstream from the strips and at a slight rise to the sluice bottom. Mercury is placed in each trough 59 formed by adjacent strips to amalgamate with and so hold any free gold. Wear upon the sluice per se is largely obviated by the steel facings 58 and by the gravel indicated at 61 which collects in each of the troughs. The sluice is arranged so that the strips 56 are readily removable therefrom to expedite cleaning out of the sluice to recover any collected gold.

The means for recovering gold does not increase the initial cost of the apparatus employed and any recovery of gold while procuring the gravel lowers the cost of production.

We claim:

The method of resoiling while procuring a gravel composition comprising excavating material, manipulating the material to secure the gravel, the manipulation including eliminating sand and silt from the gravel and depositing the same on a previously excavated area, piling the gravel composition on the area covered with sand and silt, and subsequently removing the gravel composition to leave a resoiled area.

In testimony whereof, we have hereunto set our hands.

SAMUEL A. MOSS.
JAMES GEDDES.